(12) United States Patent
Parks et al.

(10) Patent No.: US 8,674,688 B2
(45) Date of Patent: Mar. 18, 2014

(54) MEASUREMENT OF SMALL WAVELENGTH DIFFERENCE IN COHERENT LIGHT USING FARADAY EFFECT

(75) Inventors: Allen D. Parks, Spotsylvania, VA (US); Scott E. Spence, Fredericksburg, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 497 days.

(21) Appl. No.: 13/135,974

(22) Filed: Jul. 6, 2011

(65) Prior Publication Data

US 2012/0314215 A1    Dec. 13, 2012

Related U.S. Application Data

(63) Continuation-in-part of application No. 13/134,486, filed on Jun. 6, 2011, now Pat. No. 8,493,066.

(51) Int. Cl.
*G01R 33/02* (2006.01)

(52) U.S. Cl.
USPC ...................................... 324/244.1; 324/246

(58) Field of Classification Search
USPC ...................................................... 324/244.1
See application file for complete search history.

(56) References Cited

U.S. PATENT DOCUMENTS

| | | | |
|---|---|---|---|
| 5,008,622 A | 4/1991 | Overton, Jr. et al. | 324/248 |
| 5,109,196 A | 4/1992 | Wikswo, Jr. et al. | 324/263 |
| 5,333,142 A * | 7/1994 | Scheps | 372/22 |
| 6,885,192 B2 | 4/2005 | Clarke et al. | 324/300 |
| 7,193,413 B2 | 3/2007 | Kandori et al. | 324/244 |

OTHER PUBLICATIONS

A. Ghosh et al., "Observation of the Faraday effect via beam deflection in a longitudinal magnetic field", *Phys. Rev. A* 76, 055402 (2007) http://arxiv.org/PS_cache/physics/pdf/0702/0702063v1.pdf.
I. M. Duck et al., "The sense in which a 'weak measurement' of a spin-½ particle's spin component yields a value 100" *Phys. Rev. D* 40, 2112-17 (1989) http://prd.aps.org/pdf/PRD/v40/i6/p2112_1.
A. Messiah, *Quantum Mechanics*, v. 2, pp. 1068-1071 (1961).

* cited by examiner

*Primary Examiner* — Thomas F Valone
(74) *Attorney, Agent, or Firm* — Gerhard W. Thielman, Esq.

(57) ABSTRACT

An apparatus is provided for determining a target wavelength $\lambda$ of a target photon beam. The apparatus includes a photon emitter, a pre-selection polarizer, a prism composed of a Faraday medium, a post-selection polarizer, a detector and an analyzer. The photon emitter projects a monochromatic light beam at the target wavelength $\lambda$ substantially parallel to a magnetic field having strength B. The target wavelength is offset from established wavelength $\lambda'$ as $\lambda = \lambda' + \Delta\lambda$ by wavelength difference of $\Delta\lambda \ll \lambda$. The Faraday prism has Verdet value V. After passing through the pre-selection polarizer, the light beam passes through the prism and is incident to an interface surface at incidence angle $\theta_0$ to the normal of the surface and exits into a secondary medium as first and second circularly polarized light beams separated by target separation angle $\delta$ and having average refraction angle $\theta$. The secondary medium has an index of refraction of $n_0$. After passing the post-selection polarizer, the detector measures target pointer rotation angle $A_w$ based on the target separation angle $\delta$. The analyzer determines the target wavelength $\lambda$ by calculating offset pointer rotation angle $\Delta A_w = A_w - A'_w$ from calibrated pointer rotation angle $A'_w$ based on established separation angle $\delta'$ that corresponds to the established wavelength $\lambda'$, and by estimating the wavelength difference based on $$\Delta\lambda \approx -\frac{2\varepsilon\pi n_0 \Delta A_w \cos\theta'}{VB\sin\theta_0},$$

in which $\varepsilon$ is an amplification factor. A method is provided incorporating operations described for the apparatus.

6 Claims, 1 Drawing Sheet

MEASUREMENT OF SMALL WAVELENGTH DIFFERENCE IN COHERENT LIGHT USING FARADAY EFFECT

CROSS REFERENCE TO RELATED APPLICATION

The invention is a Continuation-in-Part, claims priority to and incorporates by reference in its entirety U.S. patent application Ser. No. 13/134,486 filed Jun. 6, 2011 titled "Magnetic Field Detection Using Faraday Effect" and assigned Navy Case 99670.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to detection of small wavelength differences. In particular, this invention relates to a quantum enhanced method for determining small differences in coherent photon wavelengths using weak value amplification of a Faraday Effect.

Detecting the presence of two nearly coincident wavelengths can become necessary for various operations, such as for detection of small Doppler shifts. However, conventional devices and processes exhibit deficiencies in cost and/or portability.

SUMMARY

Conventional wavelength discrimination devices yield disadvantages addressed by various exemplary embodiments of the present invention. Various exemplary embodiments provide an apparatus for determining a target wavelength $\lambda$ of a target photon beam wavelength $\lambda$ using a prism composed of a Faraday medium having Verdet value V.

The apparatus includes a photon emitter, a pre-selection polarizer, a prism composed of a Faraday medium, a post-selection polarizer, a detector and an analyzer. The photon emitter projects a monochromatic light beam at the target wavelength $\lambda$ substantially parallel to a magnetic field having strength B. The target wavelength is offset from established wavelength $\lambda'$ as $\lambda=\lambda'+\Delta\lambda$ by wavelength difference of $\Delta\lambda \ll \lambda$.

The light beam passes through the pre-selection polarizer and the prism. The beam is incident to an interface surface at incidence angle $\theta_0$ to the normal of the surface and is refracted into a secondary medium as first and second circularly polarized light beams separated by separation angle $\delta$ and having average refraction angle $\theta$. The secondary medium has an index of refraction of $n_0$.

The two circularly polarized light beams pass through the post-selection polarizer and reach the detector, which measures target pointer rotation angle $A_w$ based on the separation angle $\delta$. The analyzer determines the wavelength difference $\Delta\lambda$, first by calculating offset pointer rotation angle $\Delta A_w = A_w - A'_w$ from calibrated pointer rotation angle $A'_w$ based on the separation angle $\theta'$ that corresponds to the established wavelength $\lambda'$, and second by estimating the wavelength difference based on $$\Delta\lambda \approx -\frac{2\varepsilon\pi n_0 \Delta A_w \cos\theta'}{VB\sin\theta_0},$$

in which $\varepsilon$ is an amplification factor. Various exemplary embodiments also provide a method that incorporates operations described for the apparatus.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a floating point gate array (FPGA) or other related component.

This disclosure provides an overview of how a combined application of a recently discovered Faraday effect and weak value amplification can be used to measure $\Delta\lambda = \lambda - \lambda'$ (thereby detecting $\lambda$) when $\lambda'$ is known. The methodology has potential spectroscopic utility in such areas as measuring small Doppler shifts and detecting the presence of otherwise indistinguishable chemical or biological spectroscopic markers. Such measurements can be made using either classically intense laser light or single photon streams. For example, let $\lambda$ and $\lambda'$ be two wavelengths such that $\lambda=\lambda'+\Delta\lambda$ with $\Delta\lambda$ being small.

A longitudinal magnetic field induces a circular differential refraction of a linearly polarized photon beam at the boundary between a Faraday medium and a medium with negligible Verdet constant as reported by A. Ghosh et al., "Observation of the Faraday effect . . . " in *Phys. Rev. A* 76, 055402 (2007). See either http://www.rowland.harvard.edukjf/fischedimages/PRA_76_055402.pdf or else http://anciv.org/PS_cache/physics/pdf/0702/0702063v1.pdf for details.

This differential refraction is independent of the photon's pathlength through the Faraday medium and occurs within a few wavelengths of the boundary. The Verdet constant V represents an optical parameter that describes the strength of Faraday rotation from interaction between light and a magnetic field for a particular material, named for French physicist Émile Verdet.

Figure 1:
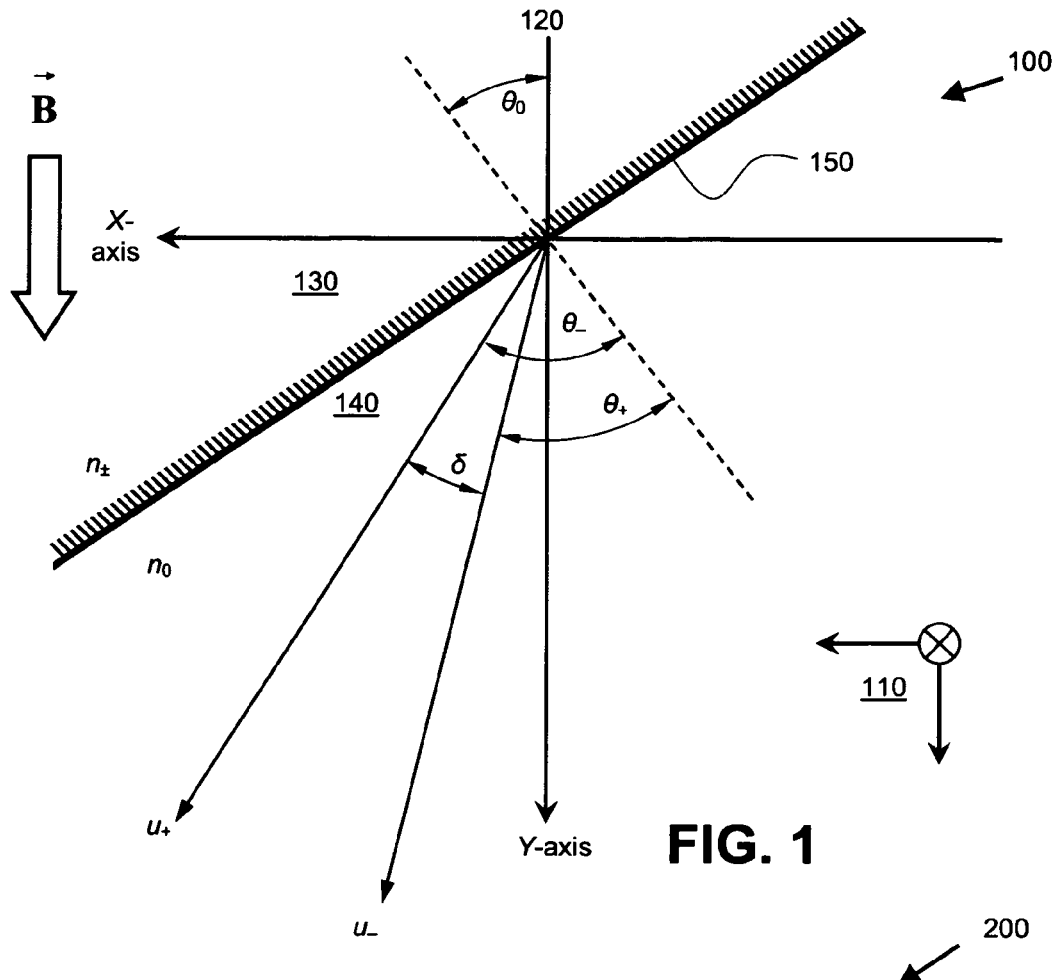
FIG. 1 is a diagram view of an optical diagram.

FIG. 1 depicts an optical diagram 100 with accompanying coordinate reference frame 110 for a monochromatic linearly polarized coherent laser beam 120 of a wavelength $\lambda$. The beam 120 forms either a classically intense continuum or a stream of single photons that is incident from a Faraday medium 130 to a secondary medium 140 of negligible Verdet constant separated by an interface boundary 150. The Faraday and secondary media 130 and 140 have respective indices of refraction $n_\pm$ and $n_0$. The subscripts plus (+) and minus (−) respectively correspond to right and left circular polarized radiation. The diagram 100 illustrates the paths taken by the light beam 120 at the interface between the Faraday medium 130 and the secondary medium 140 with negligible Verdet constant.

The beam 120 has an angle of incidence of $\theta_0$ from the normal to the interface 150. In the presence of a longitudinal magnetic field $\vec{B}$ (having strength B), the beam 120 refracts at angles $\theta_\pm$ from normal at the interface 150 into two circularly polarized beams having an angular divergence $\delta$ approximated as:

$$\delta \approx -\frac{\lambda \sin\theta_0}{\pi n_0 \cos\theta} VB, \quad (1)$$

where angle $$\theta = \frac{1}{2}(\theta_+ + \theta_-)$$

is the average of $\theta_+$ and $\theta_-$, which are respectively the right- and left-circularized refraction angles, and V is the Verdet constant for the Faraday medium 130.

As shown, the incident beam's direction of propagation determines the y-axis of the reference frame 110. The x-axis is in the plane containing the beam 120 and the normal to the interface at the point of incidence. The origin of the reference frame 110 is defined by the perpendicular intersection of the x-axis with the y-axis at the interface 150. The usual z-axis (into the plane) with positive direction $\hat{z} = \hat{x} \times \hat{y}$ completes the reference frame 110.

The longitudinal magnetic field B is assumed to be present and parallel to the positive y-axis. If the photon distribution of the incident beam 120 has a Gaussian distribution symmetric about the positive y-axis with mean value at x=0, then the refracted beams exhibit Gaussian distributions that are symmetric about their refracted paths which are along the vectors $\vec{u}_\pm$ in the x–y plane of the reference frame 110. More specifically, the refracted beams exhibit photon distribution mean values which are rotationally displaced around the z-axis through distinct angles $\theta_\pm - \theta_0$ from the positive y-axis in the direction of vectors $\vec{u}_\pm$ in the x–y plane, respectively.

This refraction process can be described from a quantum mechanical measurement perspective using the mean value of the intensity distribution profile produced by a detector as a measurement pointer. This description maintains validity for both a single photon stream and a classically intense beam.

In particular, an Hermitean operator $\hat{A}$ can be constructed and used to form a Hamiltonian operator $\hat{H}$ that describes a photon-interface interaction which produces the required geometry of the refraction process. Let $|+\rangle$ and $|-\rangle$ be the right and left circular polarization eigenstates, respectively, of the photon circular polarization operator $\hat{\sigma}$ which obey the eigenvalue equation:

$$\hat{\sigma}|\pm\rangle = \pm|\pm\rangle \quad (2)$$

and have the orthogonality properties:

$$\langle \pm|\pm\rangle = 1$$

and $$\langle \pm|\mp\rangle = 0. \quad (3)$$

One can define the "which path" operator $\hat{A}$ as:

$$\hat{A} \equiv (\theta_+ - \theta_0)|+\rangle\langle+| + (\theta_- - \theta_0)|-\rangle\langle-| \quad (4)$$

and the associated interaction Hamiltonian H can be expressed as:

$$\hat{H} = \hat{A}\hat{J}_z \delta(t - t_0). \quad (5)$$

Here the Dirac delta function $\delta(t - t_0)$ encodes the fact that the refraction occurs within a few wavelengths of the interface 150 by modeling the refraction effectively as an impulsive interaction between a photon of the beam 120 and the interface 150 at time $t_0$. The "which path" operator $\hat{A}$ accounts for the refractive angular displacements of the initial photon beam 120 at the interface 150. The operator $\hat{J}_z$ constitutes the measurement pointer's z-component of angular momentum, and couples the refractive angular displacements to the measurement pointer. One can note that:

$$[\hat{A}, \hat{J}_z] = 0, \quad (6)$$

and that $|\pm\rangle$ are eigenstates of $\hat{A}$ with respective eigenvalues $(\theta_\pm - \theta_0)$.

Figure 2:
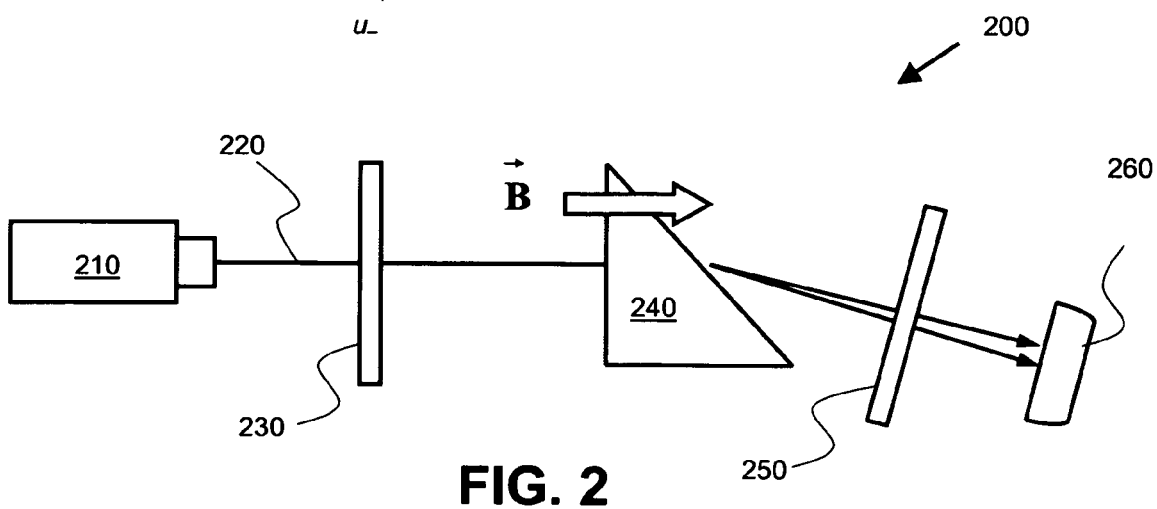
FIG. 2 is a schematic view of a wavelength discriminator apparatus.

FIG. 2 shows an elevation schematic 200 of an apparatus that employs this angular divergence. A laser 210 emits a photon beam 220 as analogous to the beam 120. The beam 220 passes through a pre-selection polarizer or polarizer 230 to reach a Faraday medium 240 (in the form of a prism), analogous to the medium 130. The refracted beam passes a post-selection polarizer or polarizer 250 to reach a detector 260 that measures the intensity distribution of the refracted polarization post-selected light beams.

For an initial photon polarization state $|\psi_i\rangle$, i.e., the pre-selected state, and an initial (Gaussian) pointer state $|\phi\rangle$, the initial state of the combined pre-selected system and measurement pointer prior to the interaction at the interface 150 at time $t_0$ constitutes the tensor product state $|\psi_i\rangle|\phi\rangle$. Note that the beam 220 has passed through the pre-selection filter 230 prior to its entry into the Faraday medium 240.

Immediately following the measurement's impulsive interaction, the combined system is in the state:

$$|\Psi\rangle = e^{-\frac{i}{\hbar}\int \hat{H} dt}|\psi_i\rangle|\phi\rangle = e^{-\frac{i}{\hbar}\hat{A}\hat{J}_z}|\psi_i\rangle|\phi\rangle. \quad (7)$$

where use has been made of the fact that the integral of the delta function is:

$$\int \delta(t - t_0) dt = 1. \quad (8)$$

Now let the initial polarization state be expressed as:

$$|\psi_i\rangle = a|+\rangle + b|-\rangle, \quad (9)$$

in which a and b are complex numbers that satisfy the condition $\langle \psi_i | \psi_i \rangle = 1$, and rewrite eqn. (7) as:

$$|\Psi\rangle = e^{-\frac{i}{\hbar}\hat{A}\hat{J}_z}(a|+\rangle + b|-\rangle)|\varphi\rangle. \tag{10}$$

Because of the orthogonality proportion of eqn. (9), the $n^{th}$ power of $\hat{A}$ assumes the form:

$$\hat{A}^n = (\theta_+ - \theta_0)^n |+\rangle\langle +| + (\theta_- - \theta_0)^n |-\rangle\langle -|, n=0, 1, 2, \ldots \tag{11}$$

Then the exponential term of the system state of eqn. (7) can be written as:

$$e^{-\frac{i}{\hbar}\hat{A}\hat{J}_z} = \sum_{n=0}^{\infty} \frac{\left[-\frac{i}{\hbar}\hat{A}\hat{J}_z\right]^n}{n!}$$

$$= \sum_{n=0}^{\infty} \frac{\left[-\frac{i}{\hbar}(\theta_+ - \theta_-)\hat{J}_z\right]^n}{n!} |+\rangle\langle +| +$$

$$\sum_{n=0}^{\infty} \frac{\left[-\frac{i}{\hbar}(\theta_- - \theta_0)\hat{J}_z\right]^n}{n!} |-\rangle\langle -|$$

$$= e^{-\frac{i}{\hbar}(\theta_+ - \theta_0)\hat{J}_z}|+\rangle\langle +| + e^{-\frac{i}{\hbar}(\theta_- - \theta_0)\hat{J}_z}|-\rangle\langle -|, \tag{12}$$

where $i=\sqrt{-1}$ is the imaginary unit and $$\hbar = \frac{h}{2\pi}$$

represents the reduced Planck constant. This result correlates refraction angle rotations with polarization.

The exponential operators constitute the rotation operators $\hat{R}_z$:

$$e^{-\frac{i}{\hbar}(\theta_\pm - \theta_0)\hat{J}_z} = \hat{R}_z(\theta_\pm - \theta_0) \equiv \hat{R}_z^\pm. \tag{13}$$

These operators rotate the x- and y-axes through angles $(\theta_\pm - \theta_0)$ around the z-axis of the reference frame 110. The rotation notation is consistent with the convention used by A. Messiah, *Quantum Mechanics*, v. 2, p. 1068 (1961).

This enables the system state in the $\{|\vec{r}\rangle\}$ representation to be rewritten as:

$$\langle\vec{r}|\Psi\rangle = a|+\rangle\langle\vec{r}|\hat{R}_z^+|\varphi\rangle + b|-\rangle\langle\vec{r}|\hat{R}_z^-|\varphi\rangle. \tag{14}$$

The associated pointer state distribution in the $\{|\vec{r}\rangle\}$-representation is then:

$$|\langle\vec{r}|\Psi\rangle|^2 = |a|^2|\langle\vec{r}|\hat{R}_z^+|\varphi\rangle|^2 + |b|^2|\langle\vec{r}|\hat{R}_z^-|\varphi\rangle|^2, \tag{15}$$

and clearly corresponds to a sum of two Gaussian distributions $|\langle\vec{r}|\hat{R}_z^\pm|\varphi\rangle|^2$ which are each symmetrically distributed about the vectors $\vec{u}_\pm$, respectively.

A final photon polarization state $|\psi_f\rangle$ that is post-selected can be expressed as:

$$|\psi_f\rangle = c|+\rangle + d|-\rangle \tag{16}$$

in which c and d represent complex numbers that satisfy the condition $\langle\psi_f|\psi_f\rangle = 1$. Note that the post-selection polarizer 250 receives the beam after refraction by the Faraday medium 240. From this, the resulting pointer state becomes:

$$|\Phi\rangle = \langle\psi_f|\Psi\rangle = ac^*\hat{R}_z^+|\varphi\rangle + bd^*\hat{R}_z^-|\varphi\rangle, \tag{17}$$

in which the asterisk denotes the complex conjugate, and its $\{|\vec{r}\rangle\}$-representation distribution is:

$$|\langle\vec{r}|\Phi\rangle|^2 = |ac^*|^2|\langle\vec{r}|\hat{R}_z^+|\varphi\rangle|^2 +$$
$$|bd^*|^2|\langle\vec{r}|\hat{R}_z^-|\varphi\rangle|^2 + 2\text{Re}ac^*bd^*\langle\vec{r}|\hat{R}_z^+|\varphi\rangle\langle$$
$$\vec{r}|\hat{R}_z^-|\varphi\rangle^*. \tag{18}$$

One may observe that although eqn. (18) constitutes a sum of two Gaussian distributions that are symmetrically distributed around vector $\vec{u}_\pm$, unlike eqn. (15), this distribution also contains an interference term. Careful manipulation of this interference term can be described herein that produces the desired amplification effect.

In contrast to a strong measurement, a weak measurement of the "which path" operator $\hat{A}$ occurs when the uncertainty $\Delta\theta$ in the pointer's rotation angle is much greater than the separation between $\hat{A}$'s eigenvalues, and when the interaction between a photon and the pointer is sufficiently weak so that the system remains essentially undisturbed by that interaction. In this case, the post-selected pointer state is represented as:

$$|\Phi\rangle = \tag{19}$$

$$\langle\psi_f|e^{-\frac{i}{\hbar}\hat{A}\hat{J}_z}|\psi_i\rangle|\varphi\rangle \approx \langle\psi_f|\left(1 - \frac{i}{\hbar}\hat{A}\hat{J}_z\right)|\psi_i\rangle|\varphi\rangle \approx \langle\psi_f|\psi_i\rangle e^{-\frac{i}{\hbar}A_w\hat{J}_z}|\varphi\rangle,$$

or else as:

$$\langle\vec{r}|\Phi\rangle \approx \langle\psi_f|\psi_i\rangle\langle\vec{r}|\hat{R}_z(\text{Re}A_w)|\varphi\rangle, \tag{20}$$

where the quantity $A_w$ is expressed as:

$$A_w = \frac{\langle\psi_f|\hat{A}|\psi_i\rangle}{\langle\psi_f|\psi_i\rangle}, \tag{21}$$

and constitutes the weak value of operator $\hat{A}$. Note that rotation angle $A_w$ is generally a complex value that can be directly calculated from the associated theory. One may also note that in response to $|\psi_i\rangle$ and $|\psi_f\rangle$ being nearly orthogonal, the real value $\text{Re}A_w$ can lie far outside the spectrum of eigenvalues for $\hat{A}$.

The pointer state distribution for eqn. (20) is:

$$|\langle\vec{r}|\Phi\rangle|^2 \approx \langle\psi_f|\psi_i\rangle|^2|\langle\vec{r}|\hat{R}_z(\text{Re}\hat{A}_w)|\varphi\rangle|^2, \tag{22}$$

and corresponds to a broad distribution that is symmetric around a vector in the x-y plane. That vector can be determined by a rotation of the x- and y-axes through an angle $\text{Re}A_w$ about the z-axis. In order that eqn. (20) be valid, both of the two following general weakness conditions for the uncertainty in the pointer rotation angle must be satisfied:

(a) $\Delta\theta \gg |A_w|$ and \hfill (23)

(b) $\Delta\theta \gg \left\{ \min_{(n=2,3,\ldots)} \left| \frac{A_w}{(A^n)} \right|^{\frac{1}{n-1}} \right\}^{-1}$, as reported by I. M. Duck et al., "The sense in which 'weak measurement' of a spin-½ particle's spin component yields a value 100" in *Phys. Rev. D* 40, 2112-17 (1989). See http://prd.aps.org/pdf/PRD/v40/i6/p2112_1 for details.

Use of the above pre- and post-selected states $|\psi_i\rangle$ and $|\psi_f\rangle$—along with eqn. (11)—provides the following scalar expression for the weak value of the $n^{th}$ moment of "which path" operator $\hat{A}$:

$$(A^n)_w = \frac{a c^* (\theta_+ - \theta_0)^n + b d^* (\theta_- - \theta_0)^n}{a c^* + b d^*}, \qquad (24)$$

where c* and d* represent complex conjugates of c and d.

When n=1, then the first moment corresponds to the pointer's peak intensity. The first moment is:

$$A_w = \frac{a c^* (\theta_+ - \theta_0) + b d^* (\theta_- - \theta_0)}{a c^* + b d^*}. \qquad (25)$$

When the transmission axis of the pre-selection polarizer 230 is set so that:

$a = \sin\phi$, and $b = \cos\phi$, (26)

and that of the post-selection polarizer 250 is set so that:

$c = \cos\chi$, and $d = -\sin\chi$, (27)

then the quantity $A_w$ becomes:

$$A_w = \operatorname{Re} A_w = \frac{(\theta_+ - \theta_0)\sin\phi\cos\chi - (\theta_- - \theta_0)\cos\phi\sin\chi}{\sin(\phi - \chi)}. \qquad (28)$$

One can observe from this that the absolute value of the "which path" scalar $|A_w|$ can be made arbitrarily large by choosing $\phi \approx \chi$, i.e., separated by a small difference term $\epsilon$. In particular, let $\chi = \phi - \epsilon$ and $\phi = \pi/4$ (in which case the pre-selected state is linearly polarized in the x-direction). Consequently, (a) $\sin\phi = \cos\phi = \sqrt{2}/2$, (29)

(b) $\cos\chi = \frac{\sqrt{2}}{2}(\cos\epsilon + \sin\epsilon)$, (c) $\sin\chi = \frac{\sqrt{2}}{2}(\cos\epsilon - \sin\epsilon)$, and (d) $\sin(\phi - \chi) = \sin\epsilon$.

The previous relation from eqn. (28) for the amplified pointer rotation angle associated with the post-selected circularly polarized beams then becomes:

$$A_w = \frac{(\theta_+ - \theta_0)(\cos\epsilon + \sin\epsilon) - (\theta_- - \theta_0)(\cos\epsilon - \sin\epsilon)}{2\sin\epsilon}, \qquad (30)$$

which can be rewritten (by simplifying grouped terms) alternatively as:

$$A_w = \frac{(\theta_+ - \theta_-)\cos\epsilon + [(\theta_+ + \theta_-) - 2\theta_0]\sin\epsilon}{2\sin\epsilon}. \qquad (31)$$

This quantity is the pointer rotation angle, which can be conveniently related to the angular divergence $\delta$ and the difference term $\epsilon$:

$$A_w = \frac{\delta}{2\tan\epsilon} + (\theta - \theta_0). \qquad (32)$$

Note that for small difference such that:

$0 < \epsilon \ll 1$, (33)

then the rotation angle becomes arbitrarily large in magnitude and can be approximated as:

$$A_w \approx \frac{\delta}{2\epsilon}, \qquad (34)$$

and because of this, $\epsilon$ can be called the amplification factor

The weakness condition constraint follows when eqns. (24) and (25) can be used to obtain the associated weakness condition when incorporating $0 < \epsilon \ll 1$ from eqn. (33) into inequalities eqn. (23), along with selections for a, b, c, d, $\phi$, $\chi$. These steps yield:

(a) $\Delta\theta \gg \frac{|\delta|}{2\epsilon}$ and (b) $\Delta\theta \gg 2|\theta - \theta_0|$. (35)

Here use is made of the fact that for $0 < \epsilon \ll 1$ being sufficiently small, then:

$$\min_{(n=2,3,\ldots)} \left| \frac{A_w}{(A^n)} \right|^{\frac{1}{n-1}} \approx \min_{(n=2,3,\ldots)} \left| \frac{(\theta_+ - \theta_0) - (\theta_- - \theta_0)}{(\theta_+ - \theta_0)^n - (\theta_- - \theta_0)^n} \right|^{\frac{1}{n-1}} \qquad (36)$$

$$= \left| \frac{(\theta_+ - \theta_0) - (\theta_- - \theta_0)}{(\theta_+ - \theta_0)^2 - (\theta_- - \theta_0)^2} \right| = |(\theta_+ - \theta_0) -$$

$$(\theta_- - \theta_0)|^{-1}(2|\theta - \theta_0|)^{-1}.$$

Satisfaction of both conditions (a) and (b) of eqn. (35) requires that when $0 < \epsilon \ll 1$ from eqn. (33), then the uncertainty $\Delta\theta$ greatly exceeds the absolute ratio value:

$$\Delta\theta \gg \left| \frac{\delta}{2\epsilon} \right|. \qquad (37)$$

This condition can be satisfied by making the initial Gaussian pointer distribution width sufficiently large.

Thus, as per eqns. (22) and (34), the rotation of the initial photon distribution axis of symmetry provides an amplified measurement of the angular divergence δ via the weak value of the "which path" operator Â. For a known amplification ε and a measured mean value of the intensity distribution profile produced by the detector 260 corresponding to $A_w$, then angular divergence δ can be estimated from eqn. (34) as:

$$\delta \approx 2\varepsilon A_w. \qquad (38)$$

The real component of the complex operator $A_w = \text{Re} A_w$ corresponds to the angle between the direction of the resultant photon distribution peak and the positive y-axis is measured when there is sufficient knowledge of the value of the other parameters (e.g., θ, $n_0$, V, etc.) appearing on the right hand side of this expression.

Consider the case where a target wavelength λ, can be expressed as the sum of a known wavelength λ' and a difference wavelength Δλ:

$$\lambda = \lambda' + \Delta\lambda. \qquad (39)$$

and similarly average refraction angle θ can be expressed as the sum of a known angle θ' and a corresponding difference Δθ:

$$\theta = \theta' + \Delta\theta, \qquad (40)$$

so that approximation eqn. (1) can be written as:

$$\delta \approx -\frac{(\lambda' + \Delta\lambda)\sin\theta_0}{\pi n_0 \cos(\theta' + \Delta\theta)} VB \qquad (41)$$

or rewritten as the approximation:

$$\delta \approx -\frac{\lambda' \sin\theta_0}{\pi n_0 \cos\theta'} VB - \frac{\Delta\lambda \sin\theta_0}{\pi n_0 \cos\theta'} VB \equiv \delta' + \Delta\delta, \qquad (42)$$

where, because Δθ is small, use has been made of the approximation $$\cos(\theta' + \Delta\theta) \approx \cos\theta'. \qquad (43)$$

Using eqn. (42) in eqn. (34) renders:

$$A_w \approx \frac{\delta'}{2\varepsilon} + \frac{\Delta\delta}{2\varepsilon} \equiv A'_w + \Delta A_w, \qquad (44)$$

where $A'_w$ represents rotation angle corresponding to the mean value of the photon distribution profile associated with the measurement of the known wavelength λ'. Note that the rotation angle $A_w = A'_w$ when there is no wavelength difference or $\Delta\lambda = 0 = \Delta A_w$.

The apparatus represented by the diagram 200 in FIG. 2 can be used to detect $\lambda = \lambda' + \Delta\lambda$ from eqn. (39) and estimate Δλ when λ' is known. In order to accomplish this, the apparatus must first be calibrated so that its pointer value is $A'_w$ when the source is monochromatic with a known wavelength λ'. In particular, the photon distribution peak $A'_w$ is determined by enabling monochromatic light of wavelength λ' to traverse the apparatus that comprises a Faraday medium with Verdet constant V.

In this example, the parameters $\theta_0$, $n_0$, B are fixed and the polarizers are set per above values to provide an amplification factor ε. When light of wavelength λ (bichromatic or monochromatic) traverses the calibrated apparatus, then the pointer deviates from the calibrated pointer value $A'_w$ by the amount $$\frac{\Delta\delta}{2\varepsilon}.$$

As numerical examples, consider an additional two instances in which the medium 140 with negligible Verdet constant is air. For the first example, let the Faraday medium 130 be terbium gallium garnet (formula $Tb_3Ga_5O_{12}$) which has a Verdet constant V=−134 rad·Tesla$^{-1}$·m$^{-1}$ at known wavelength λ'=632.8 nm (red light) so that $$\Delta A_w \approx 21.33\left(\frac{\Delta\lambda \cdot B}{\varepsilon}\right)\text{rad} \cdot \text{Tesla}^{-1} \cdot m^{-1}.$$

If for this first example, the amplification is ε=10$^{-4}$, the wavelength difference is Δλ=1 pm and magnetic field strength is B=1 Tesla, then rotation angle difference is $\Delta A_w \approx 21.33$ μrad, provided that the associated weakness condition of minimum rotation angle difference $$\Delta\theta \gg \frac{1.35}{\varepsilon} \times 10^{-5} \text{ rad} = 0.135 \text{ rad}$$

is satisfied. If the detector 260 is 1 m (one meter) from the Faraday medium 240, then the pointer is translated by −21 μm in the detector plane. Thus, the 1 pm spectrum separation has been amplified by a factor of ~10$^6$ at the detector 260.

For the second example, let the Faraday medium be MR3-2 Faraday rotator glass which has a Verdet constant V=−31.4 rad·Tesla$^{-1}$·m$^{-1}$ at known wavelength λ'=1064 nm (and 20° C. temperature) so that the rotation angle difference is $$\Delta A_w \approx 4.997\left(\frac{\Delta\lambda \cdot B}{\varepsilon}\right)\text{rad} \cdot \text{Tesla}^{-1} \cdot m^{-1}.$$

If ε=10$^{-3}$, Δλ=1 nm and B=1 Tesla, then $\Delta A_w \approx 4.997$ μrad provided that the associated weakness condition $$\Delta\theta \gg \frac{5.317}{\varepsilon} \times 10^{-6} \text{ rad} = 5.317 \text{ mrad}$$

is satisfied.

If the detector 260 is 1 m (one meter) distant from the Faraday medium, then the pointer translates by ~5.0 μm in the detector plane. Thus, the 1 nm spectral separation has been amplified by a factor of ~10$^3$ at the detector 260 for the medium 140 with negligible Verdet constant (and unitary refraction index) being air.

As described above, known beam wavelength λ', magnetic field strength B and angle-of-incidence $\theta_0$ are established á priori. The refraction angle θ' represents the average of the refraction angles for the circularly polarized beams determined for the known wavelength λ' based on the indices of refraction $n_\pm$ of the Faraday medium 130.

For small differences such that $\Delta\lambda \equiv \lambda - \lambda' \ll \lambda$ between unknown and known wavelengths, the average angular refraction angle difference between the unknown (i.e., target) and known refractions $\Delta\theta \equiv \theta - \theta'$ is small. This enables the average refraction angle to be reasonably approximated by the known value as $\theta \approx \theta'$. The approximation $\cos\theta \approx \cos\theta'$ can be made, because of the relation:

$$\cos(\theta'+\Delta\theta)=\cos\theta'\cos\Delta\theta-\sin\theta'\sin\Delta\theta \approx \cos\theta'-\Delta\theta\sin\theta' \approx \cos\theta'. \quad (45)$$

The distribution peak rotation angle $A'_w$ corresponding to the known wavelength $\lambda'$ can be established from a calibration measurement. For a small amplification factor E such that $0<\epsilon\ll 1$, the rotation angle $A_w$ corresponding to the unknown wavelength $\lambda$ provides an estimate of the divergence $\delta$ from eqn. (38) as $\delta=2\epsilon A_w$. Similarly, the known rotator angle $A'_w$ the estimate for the corresponding divergence $\delta'$.

In response to a small change in wavelength from the known $\lambda'$ to an unknown $\lambda$ value, the measured rotator angle becomes $A_w=A'_w+\Delta A_w$ with the difference $\Delta A_w$ corresponding to the change in measured rotation angle due to the offset wavelength that provides a measure of change in dispersion angle from eqn. (42) as $\Delta\delta$. Subtracting the calibrated values and rearranging terms enables the wavelength difference to be determined as:

$$\Delta\lambda = -\frac{\pi n_0 \Delta\delta\cos\theta'}{VB\sin\theta_0} \approx -\frac{2\epsilon\pi n_0 \Delta A_w\cos\theta'}{VB\sin\theta_0}. \quad (46)$$

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An apparatus for determining a target wavelength $\lambda$ of a target photon beam, said apparatus comprising:
    a photon emitter for projecting a monochromatic light beam at the target wavelength $\lambda$ substantially parallel to a magnetic field having strength B and offset from established wavelength $\lambda'$ as $\lambda=\lambda'+\Delta\lambda$ by a wavelength difference of $\Delta\lambda\ll\lambda$;
    a pre-selection polarizer through which said light beam passes from said emitter as a pre-selection light beam;
    a prism composed of a Faraday medium having Verdet value V through which said pre-selection light beam passes from said pre-selection polarizer and is incident to an interface surface at incidence angle $\theta_0$ to a normal of said surface and exists into a secondary medium as first and second circularly polarized light beams separated by target separation angle $\delta$ and having average target refraction angle $\theta$, said secondary medium having index of refraction of $n_0$;
    a post-selection polarizer through which said polarized light beams pass as post-selection light beams;
    a detector for receiving said post-selection light beams and measuring target pointer rotation angle $A_w$ based on said target separation angle $\delta$; and
    an analyzer for determining the target wavelength $\lambda$ by calculating offset pointer rotation angle $\Delta A_w=A_w-A'_w$ from calibrated pointer rotation angle $A'_w$ based on established separation angle $\delta'$ that corresponds to said established wavelength $\lambda'$, and by estimating said wavelength difference based on $$\Delta\lambda \approx -\frac{2\epsilon\pi n_0 \Delta A_w\cos\theta'}{VB\sin\theta_0},$$

in which $\epsilon$ is an amplification factor, and $\theta'$ is average established refraction angle.

2. The apparatus according to claim 1, wherein said pointer rotation angle is $$A_w = \frac{(\theta_+ - \theta_-)\cos\epsilon + [(\theta_+ + \theta_-) - 2\theta_0]\sin\epsilon}{2\sin\epsilon}$$

in which $\theta_+$ and $\theta_-$ are respectively right- and left-polarized refraction angles with said average target refraction angle such that $\theta=\frac{1}{2}(\theta_++\theta_-)$.

3. The apparatus according to claim 1, wherein said analyzer estimates divergence $\delta\approx 2\epsilon A_w$ for determining the target wavelength.

4. A method for determining a target wavelength $\lambda$ of a target photon beam, said method comprising:
    emitting a monochromatic light beam at the target wavelength $\lambda$, substantially parallel to a magnetic field having strength B and offset from established wavelength $\lambda'$ as $\lambda=\lambda'+\Delta\lambda$ by wavelength difference of $\Delta\lambda\ll\lambda$;
    pre-selection filtering of said monochromatic light beam as a pre-selection light beam;
    refracting said pre-selection light beam through a prism composed of a Faraday medium having Verdet value V such that said light beam is incident to an interface surface at incidence angle $\theta_0$ to a normal of said surface and exits into a secondary medium as first and second circularly polarized light beams separated by target separation angle $\delta$ and having average target refraction angle $\theta$, said secondary medium having index of refraction of $n_0$;
    post-selection filtering of said polarized light beams as post-selection light beams;
    measuring target pointer rotation angle $A_w$ based on said target separation angle $\delta$ of said post-selection light beams; and
    determining the target wavelength $\lambda$ by calculating offset pointer rotation angle $\Delta\lambda=A_w-A'_w$ from calibrated pointer rotation angle $A'_w$ based on established separation angle $\delta'$ that corresponds to said established wavelength $\lambda'$, and by estimating said wavelength difference based on $$\Delta\lambda \approx -\frac{2\epsilon\pi n_0 \Delta A_w\cos\theta'}{VB\sin\theta_0},$$

in which $\epsilon$ is an amplification factor, and $\theta'$ is average established refraction angle.

5. The method according to claim 4, wherein said pointer rotation angle is $$A_w = \frac{(\theta_+ - \theta_-)\cos\epsilon + [(\theta_+ + \theta_-) - 2\theta_0]\sin\epsilon}{2\sin\epsilon}$$

in which $\theta_+$ and $\theta_-$ are respectively right- and left-polarized refraction angles with said average target refraction angle such that $$\theta = \frac{1}{2}(\theta_+ + \theta_-).$$

6. The method according to claim 4, further including estimating divergence $\delta \approx 2\epsilon A_w$ to determine the target wavelength.

* * * * *